Patented June 16, 1953

2,642,373

UNITED STATES PATENT OFFICE 2,642,373

2-HYDROXYETHYL 2-PHENYLETHYL SULFIDE AS A FUNGICIDE

Joachim Dazzi, Dayton, Ohio, assignor to Monsanto Chemical Company, St. Louis, Mo., a corporation of Delaware No Drawing. Application March 25, 1950,
Serial No. 151,994

2 Claims. (Cl. 167—30)

This invention relates to new and useful improvements in biological toxicants. The invention further relates to methods of treating plants and other organic materials which are subject to attack by fungi.

I have found that unusually effective fungicidal compositions are obtained when the active ingredient of such compositions is a compound having the general structure:

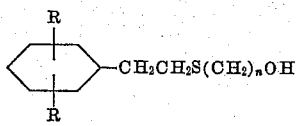

in which R is a member of the group consisting of hydrogen, chlorine, bromine and fluorine and $n$ is an integer of from 2 to 4.

Compounds having the above general formula include the ω-hydroxyalkyl 2-phenylethyl sulfides having the general structure:

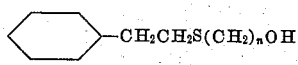

in which $n$ is an integer of from 2 to 4; and derivatives thereof having the general formula:

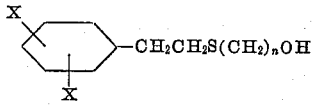

in which X is a member of the group consisting of chlorine, bromine, and fluorine and $n$ is an integer of from 2 to 4. As illustrative of compounds having the above general formulas may be mentioned 2-hydroxyethyl 2-phenylethyl sulfide, 3-hydroxypropyl 2-phenylethyl sulfide, 4-hydroxybutyl 2-phenylethyl sulfide, 2-hydroxyethyl 2-(4-chlorophenyl)ethyl sulfide, 3-hydroxypropyl 2-(3-bromophenyl)ethyl sulfide, 2-hydroxyethyl 2-(4-fluorophenyl)ethyl sulfide, 4-hydroxybutyl 2-(2,3-dichlorophenyl)ethyl sulfide, etc. These compounds are readily obtainable by reaction of styrene or its nuclear mono- or di-chloro, bromo, or fluoro derivatives with mercapto alcohols produced by the addition reaction of hydrogen sulfide and an alkylene oxide, e. g., ethylene oxide, methylethylene oxide, propylene oxide or butylene oxide in known manner; e. g., as described in the British Patent No. 532,676 issued to J. G. Fife. The compounds are highly efficient for preventing and retarding fungus growth on plants, fruits, seeds, soils, fur, leather, cotton, wood and organic materials in general. They may be applied directly to the organic material which is to be treated, but because the present sulfides are effective in extremely dilute concentrations, it is preferred to incorporate the present agents with a carrier or diluent.

Fungicidal dusts may be prepared by mixing the present sulfides with dusting materials such as talc, clay, lime, bentonite, pumice, fuller's earth, etc. The present sulfides are soluble in the usual organic solvents and may be used in solution, e. g., in ethanol solution as fungicidal sprays. Suspensions or dispersions of the sulfides in a non-solvent such as water are advantageously employed in the treatment of plant foliage, textiles, leather and other materials with which it is not desirable to employ either a solid carrier or an organic solvent.

Fungicidal compositions comprising the present active ingredients may be applied only to the surface of the material to be treated as when treating foliage, furs, leather and other comparatively impregnable materials upon which fungus growth is to be prevented or retarded. In other cases, for example, when it is desired to protect seeds from soil microorganisms harmful to the seeds and plants, the hydroxyalkyl phenylethyl sulfides, preferably incorporated with a solid carrier, may be mixed with the seed. For protection of fruits, seeds, plant tubers, etc. during storage, it may be advantageous to effect the treatment by employing baths comprising aqueous emulsions of the fungicides. Impregnation of textiles with the fungicides is also advantageously effected by immersion in solutions of these compounds.

The invention is further illustrated, but not limited, by the following example:

Example 2-hydroxyethyl 2-phenylethyl sulfide was tested against *Aspergillus niger* using the following testing procedure:

*Preliminary.* — Trommel's Malt Agar was poured into a Petri plate and allowed to harden. A circular section was cut from the center and into this cup was placed 0.1 gram of the sulfide. The plate was then sprayed with a fresh aqueous spore suspension of *Aspergillus niger* and incubated at a temperature of 28° C. for five days. Inspection of the incubated plate at the end of that time showed no growth of *Aspergillus niger* within a 5 mm. zone.

*Secondary.*—To 100 cc. of hot Trommel's Malt Agar was added 0.1 gram of the present sulfide. The agar was then whipped into an emulsion and poured into a cold plate and allowed to harden. 50 cc. of hot agar was added to 50 cc. of the above toxic agar to give a sulfide concentration of 0.05 per cent. To 10 cc. of the remaining toxic agar was added 90 cc. of agar to give a concentration of 0.005 per cent. Petri plates were poured from each of the two mixtures, i. e., that having a 2-hydroxyethyl 2-phenylethyl sulfide concentration of 0.05 per cent and that having an 0.005 per cent concentration. The plates were then sprayed with *Aspergillus niger* and incubated at a temperature of 28° C. for five days. At the end of that time inspection of the plates showed that on plates of both the 0.05 per cent and 0.005 per cent concentration the growth of *Aspergillus niger* was completely inhibited.

Similarly good results against this organism are obtained by employing other hydroxyalkyl 2-phenylethyl sulfides or the chloro, bromo or fluoro derivatives thereof, e. g., 4-hydroxybutyl 2-phenylethyl sulfide, 2-hydroxyethyl 2-(2,3-dichlorophenyl)ethyl sulfide, and 2-hydroxypropyl 2-(4-fluorophenyl)ethyl sulfide.

The present sulfides may also be employed as fungicides against the following organisms: *Sclerotinia fructiola, Trychophyton interdigitale, T. Rubrum, C. Albicans, Stemphyllium sarcinoformae*, etc. The choice of the particular sulfide employed depends somewhat upon the organic material which is to be treated. Generally the halogen free sulfides are preferred when phytocidal action is to be avoided.

What I claim is:

1. The method of protecting organic material susceptible to attack by fungi which comprises applying to said organic material a fungicidal composition comprising 2-hydroxyethyl 2-phenylethyl sulfide.

2. The method of destroying fungus which comprises applying 2-hydroxyethyl 2-phenylethyl sulfide to said fungus.

JOACHIM DAZZI.

References Cited in the file of this patent

FOREIGN PATENTS

| Number | Country | Date |
|--------|---------|------|
| 665,371 | Germany | Sept. 24, 1938 |
| 532,676 | Great Britain | Jan. 29, 1941 |
| 363,656 | Germany | Nov. 11, 1922 |

OTHER REFERENCES

Hoskins et al.: Journal of Economic Entomology, volume 33, Number 6, December 1940, pages 875 to 881.